June 5, 1934.　　　B. R. DIERFELD　　　1,961,207
BRAKE FOR MOTOR CARS
Original Filed Feb. 12, 1927　　2 Sheets-Sheet 1

Patented June 5, 1934

1,961,207

UNITED STATES PATENT OFFICE 1,961,207

BRAKE FOR MOTOR CARS

Benno R. Dierfeld, Berlin-Friedenau, Germany

Application February 12, 1927, Serial No. 167,720.
Renewed August 30, 1933. In Germany February 22, 1926

2 Claims. (Cl. 188—152)

This invention relates to a brake intended for motor cars and rail vehicles, and to be actuated by a liquid under pressure or a compressed gas. The gist of the invention resides therein that in a brake casing located on the axle casing of the respective car or vehicle and connected with a wheel of the same, two brake disks are arranged which can be shifted axially, i. e. co-axially with the wheel, but cannot be turned; said disks form with each other, or with the walls of the brake casing respectively, pressure chambers connected by pipes with the compressed-fluid receptacle and carrying on their outer sides a covering acting upon an oppositely located covering of the brake casing.

If a compressed gas or compressed air is used instead of a liquid under pressure only other tightening members are employed, whereas in all other respects the construction remains unchanged.

Figure 1:
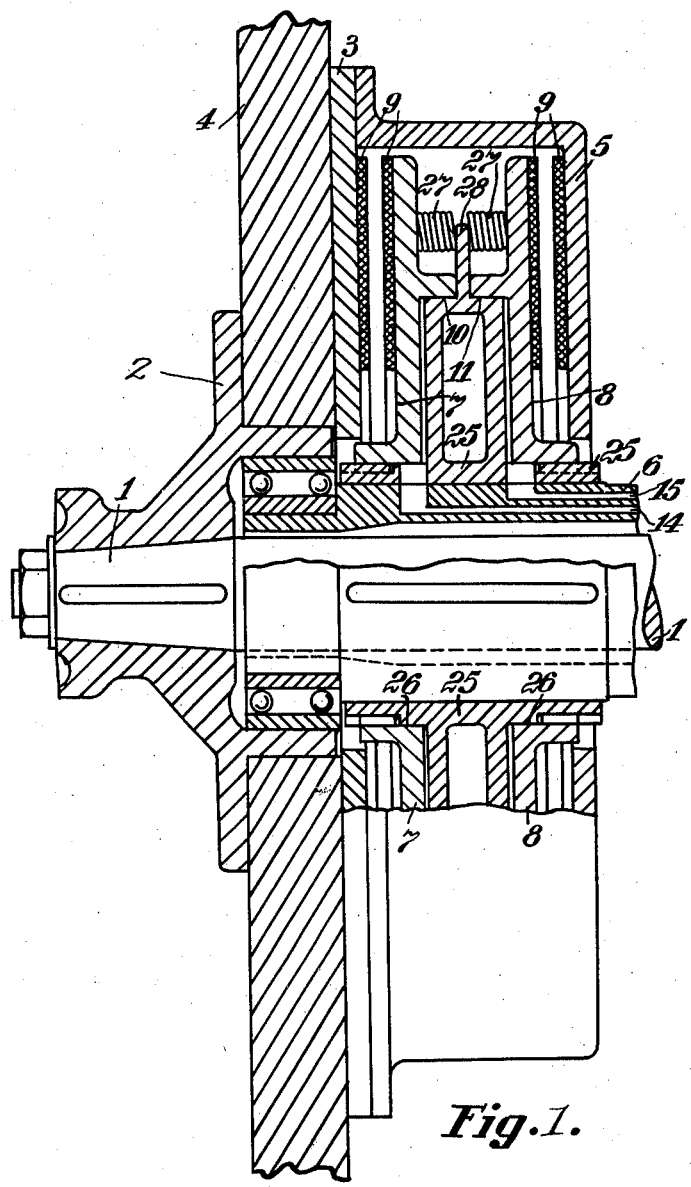
Figure 2:
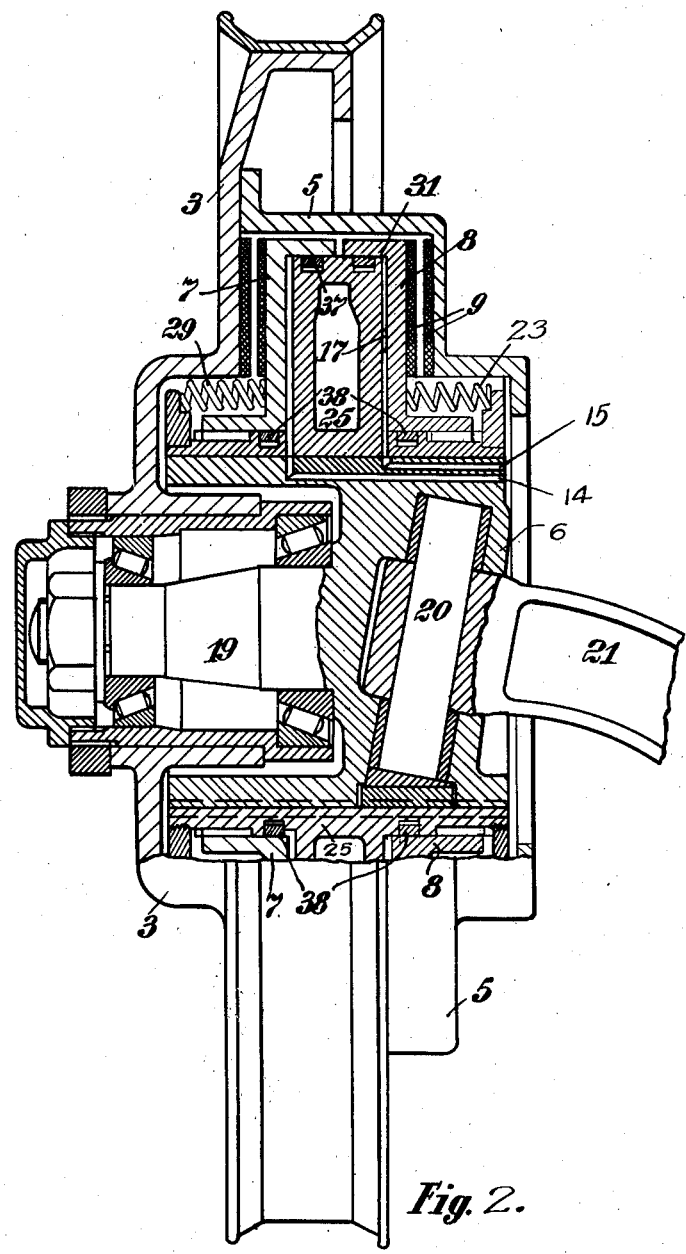

The invention is illustrated diagrammatically and by way of example on the accompanying drawings on which Figure 1 is an axial section through an arrangement and combination of parts embodying the invention, there being assumed in this case a normal rear axle and a wooden wheel, Fig. 2 is a view similar to Fig. 1 showing a modification of the invention applied to a metallic wheel connected with an axle to permit steering movement of the wheel.

Referring to Fig. 1, 1 denotes the rear axle shaft, to which the outer wheel flange 2 is keyed. This flange and the inner brake casing 3 are connected by screws with each other. The wooden wheel 4 is held fast between said flanges in the usual manner. The inner brake casing 3 is connected also with the outer brake casing 5 by screws. The parts 1, 2, 3, 5 represent, therefore, a whole that turns upon the stationary rear axle casing 6. In the wheel flange 2 is provided a double ball bearing. The cylindrical part of the casing 6 passes through the two brake disks 7 and 8 which can be shifted axially, but not turned, and are provided with long hubs. The plane outer surfaces of these disks are provided with a covering 9, and similar coverings 9 are provided on the inner surfaces of the casings 3 and 5. 25 denotes a stationary casing piece that is keyed to the cylindrical part 6 of the axle casing, and upon the grooved hub flanges of which the two brake disks 7 and 8 can be axially shifted, but cannot be turned thereon. These brake disks form, together with said casing piece 25, two pressure chambers which are bounded exteriorly by the brake disk flanges 10 and 11, and at the hub by the cylindrical surfaces 26.

If one or the other pressure chamber is filled with the fluid under pressure through the channel 14 or 15, in the casing 6 the covering 9 of the disk 7 or of the disk 8 will contact with the covering 9 of the brake casing 3 or 5 that is turned together with the wheel, and one or the other brake will be actuated. In emergency cases the fluid under pressure is conducted through the channels 14 and 15 simultaneously into both pressure chambers. The two disks 7 and 8 are then simultaneously pressed outwardly against the brake casings 3 and 5, whereby a very strong braking is effected. The flow of fluid through the channels 14 and 15 is controlled by a suitable distributor, not shown, and to release the brake the distributor is so actuated that the fluid under pressure leaves the pressure chambers whereafter the springs 27 that connect the disks 7 and 8 with the lug 28 of the stationary casing member 25 move the disks automatically into the middle position shown in the drawings, the flanges 10 and 11 contacting now with said lug 28.

Instead of arranging the pulling-back springs exteriorly on the circumference of the brake disks, they may be arranged at the brake disk hubs, whereby certain advantages can be obtained. The diameter of the pressure chambers can be increased by as much as corresponds to the diameter of the outer springs whereby the pressure surface will be considerably increased, or the diameter of the brake drum may be correspondingly decreased, or, finally, the inner diameter of the brake disk is increased (which may be desired especially in the case of four-wheel drive) without decreasing materially the effective pressure surface.

In the form of invention shown in Fig. 1, a wooden wheel is provided with a separate brake drum, while in the form of the invention shown in Fig. 2 a metallic disk wheel is provided which forms part of the casing. The wheel shown in Fig. 2 consists of two casing parts or disks 3 and 5 which are connected with each other by screws. The wheel runs loosely on two roller bearings carried on the movable axial extension 19 which is made integral with the hollow cylindrical member 6 in which the steering knuckle pivot 20 is supported. This pivot is connected with the extremity of the axle 21 in the usual manner and the brake disks are connected in such manner as to permit axial movement thereof, without rotation, while the casing 3—5 can rotate upon the member 6. The constructive details of the brake blocks, the pressure chambers and the like are the same as in Fig. 1, except that instead of the concentric springs arranged on the circumference of the brake disks the springs are arranged at the outer side of the brake disk hubs where they are very well accessible. As shown, a plurality of parallel helical springs 29 located between the brake disk 7 and the stationary middle piece 25 are provided.

In Fig. 2 the guide pivot 20 is arranged obliquely, and its axial line intersects the point of contact between the wheel and the street or road. There are also provided two oblique roller bearings which take up the axial pressure arising during the braking, as well as the pressure produced by shocks caused by the street or road. The wheel is a one-parted metal-disk wheel and its disk body 3 is provided with the covering for the lefthand brake disk. In contradistinction to the normal construction of mechanical brakes where the brake drum is enclosed in the body of the disk wheel so that the cylindrical brake surface is not reached at all by the air-draught, both large brake surfaces are, with the present improved construction of a mechanical brake, exposed constantly to the cooling action of the air.

If this brake is to be operated with highly compressed air, the tightening surfaces should be provided with suitable packings.

A simple packing arrangement of suitable construction is shown in Fig. 2, in which elastic packing rings 37 and 38 of steel are inserted between the stationary middle piece 25 and the brake disks 7 and 8, these rings acting like the known spring piston rings. The disk 8 and middle piece 25 are provided with corresponding abutment projections 17 upon their inner sides.

All braking devices described in the preceding pages present the advantage that without straining the body a very great braking effect can be produced, although only a low braking pressure is required. A special braking equalization is omitted because the equalization takes place through the braking fluid. Also no re-adjustment is necessary, and the wear and tear is very slight by reason of the large size of the braking surfaces. The entire arrangement and combination of parts is, therefore, cheaper and simpler than with the present four-wheel brake with servo-provision. In every case the plane braking faces will brake free of shocks, that is to say, a certain and desired sliding motion will take place before the wheel is blocked.

I claim:

1. In a brake structure adapted to be operated by fluid under pressure, a wheel, a brake casing connected with said wheel, two axially movable and non-rotatable brake discs arranged in said casing coaxially with the wheel, a center wall in said casing, said brake disks and the opposing sides of the center wall forming two pressure chambers, springs arranged to move the disks to initial position, and channels communicating with said chambers.

2. In a brake structure operable by fluid under pressure, a wheel, a brake casing connected with the wheel, two axially movable and non-rotatable brake disks arranged in said casing coaxially with the wheel, a center wall in said casing, said brake disks and the opposed sides of the center wall forming chambers, flanges on said brake disks partially overlying said center wall, and channels communicating with said chambers.

BENNO R. DIERFELD.